Dec. 3, 1957 C. J. RAYNOR 2,815,177
SACKED-MATERIAL CONDITIONING MACHINE, INCLUDING
OPPOSED VIBRATING CONVEYOR BELTS
Filed March 6, 1956 3 Sheets-Sheet 1

Charlie J. Raynor
INVENTOR.

BY
Attorneys

Dec. 3, 1957 C. J. RAYNOR 2,815,177
SACKED-MATERIAL CONDITIONING MACHINE, INCLUDING
OPPOSED VIBRATING CONVEYOR BELTS
Filed March 6, 1956 3 Sheets-Sheet 3

Charlie J. Raynor
INVENTOR.

BY
Attorneys

2,815,177

SACKED-MATERIAL CONDITIONING MACHINE, INCLUDING OPPOSED VIBRATING CONVEYOR BELTS

Charlie J. Raynor, Rocky Mount, N. C., assignor to Planters Cotton Oil & Fertilizer Company, Rocky Mount, N. C., a corporation of Delaware Application March 6, 1956, Serial No. 569,893

2 Claims. (Cl. 241—200)

This invention generally relates to a machine for conditioning various types of material that become caked or get lumpy when stored whereby the material may be broken up or loosened to permit use thereof.

In the storage of many materials such as chemicals, fertilizers, cement, salt, sugar, soy bean meal, cotton seed meal, various types of feeds, it is a well known problem that these compounds will absorb a certain amount of moisture from the air and become hard or lumpy. This may happed whether the material is stored in a sack or whether it is stored in a bulk form. In order to properly employ the material it is necessary that the lumps or cakes be broken up so that the material is once again provided with a smooth texture so that such material may be employed as desired or sacked or handled as desired. Accordingly, it is the primary object of the present invention to provide a machine for conditioning the hardened or lumpy material so that it may be broken up into a smooth texture material for proper use.

A further object of the present invention is to provide a material conditioning machine which may be employed in conjunction with sacked or unsacked material but is especially provided to condition sacked material with the material remaining in the sack without damage to the sack or the material therein.

Yet another object of the present invention is to provide a conditioning machine in accordance with the preceding objects including a pair of belt conveyors disposed in overlying relation for receiving the material to be conditioned therebetween together with agitating or vibrating means for conditioning the material as it passes between the endless belt conveyors.

Other objects of the present invention will reside in its simplicity of construction, ease of operation, adaptation for its particular purposes and its relatively inexpensive manufacturing cost.

Figure 1:
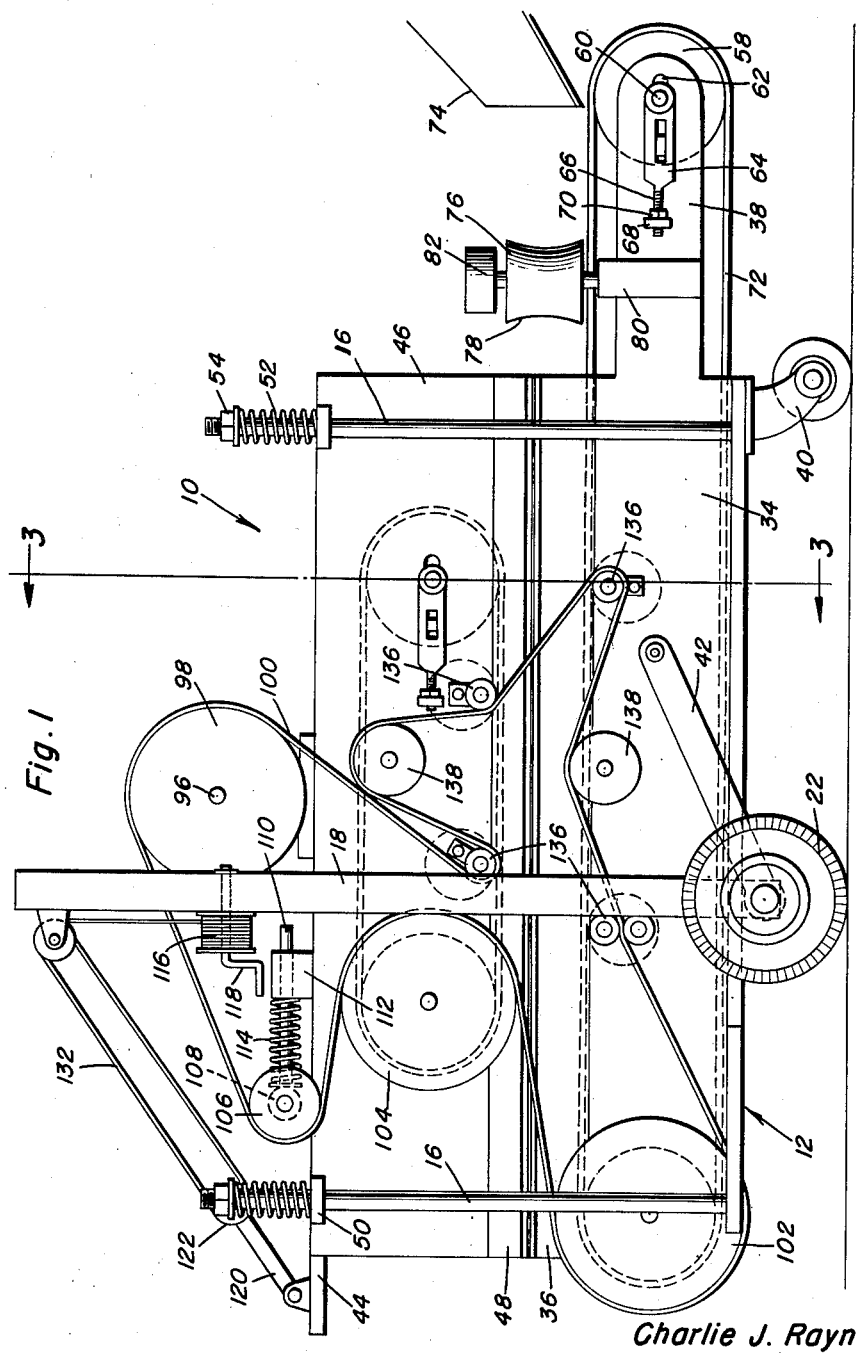
Figure 2:
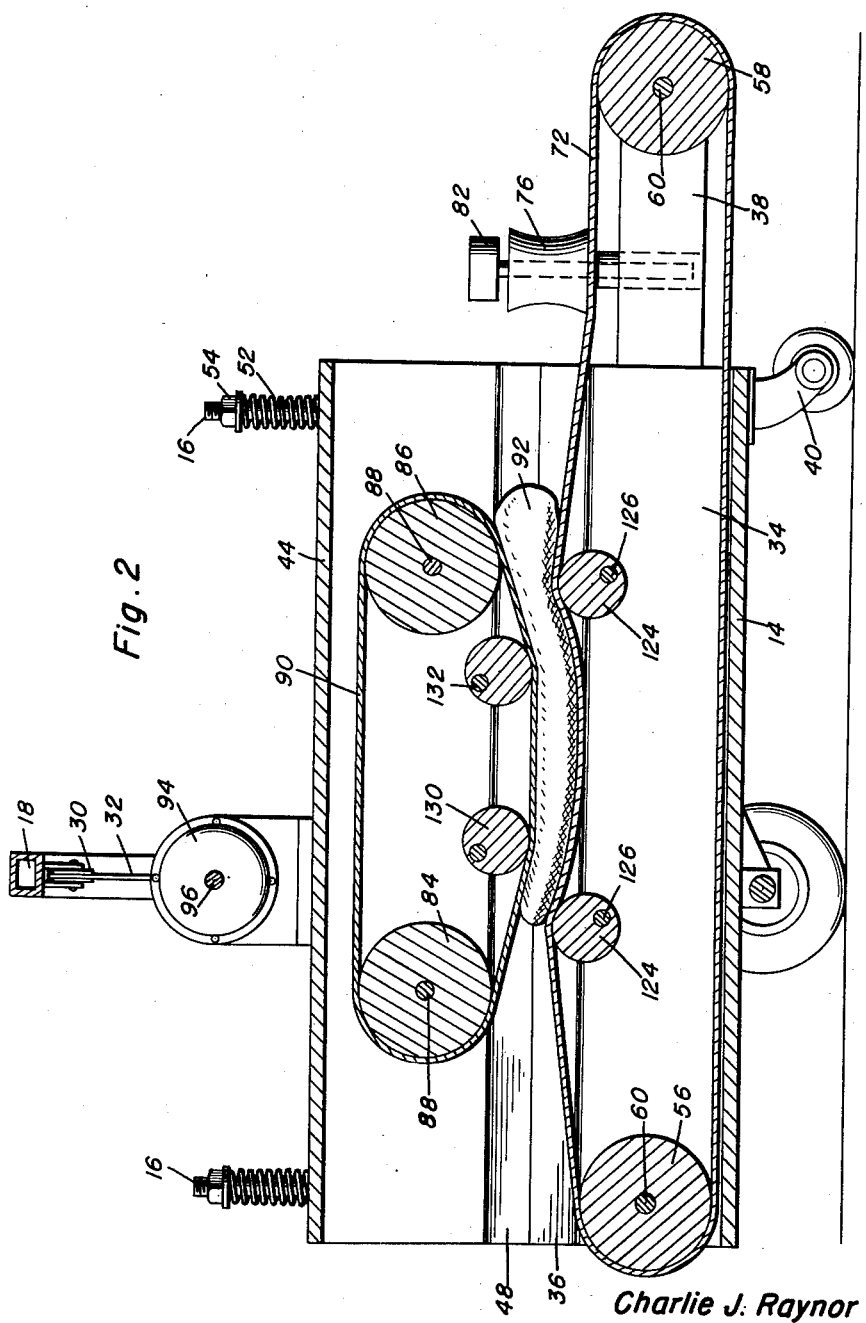
Figure 3:
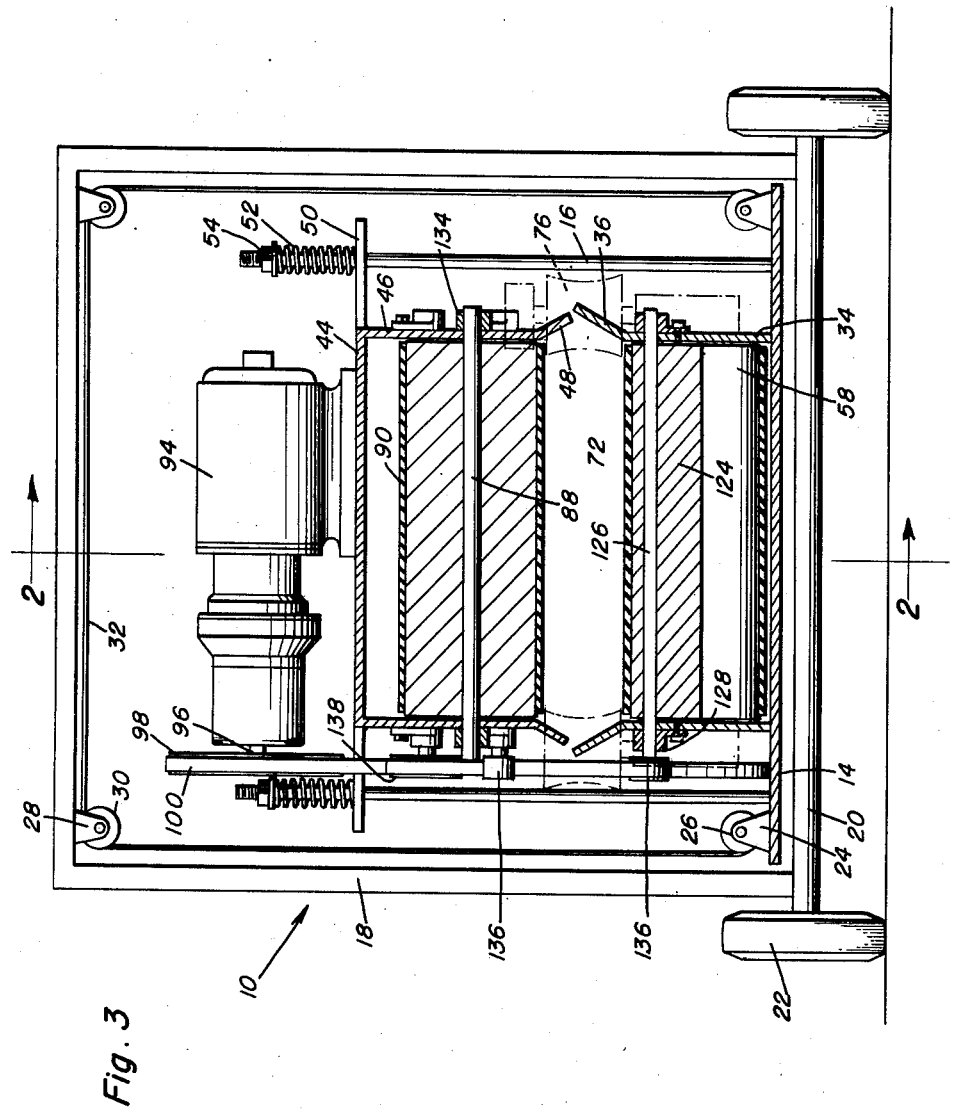

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the material conditioning machine of the present invention;

Figure 2 is a longitudinal, vertical sectional view taken substantially upon a plane passing along section line 2—2 of Figure 3 illustrating the details of construction of the conditioning machine and specifically illustrating the orientation of the rollers and vibrating means; and Figure 3 is a transverse, vertical sectional view taken substantially upon a plane passing along section line 3—3 of Figure 1 illustrating further structural details of the conditioning machine.

Referring now specifically to the drawings, the numeral 10 generally designates the material conditioning machine of the present invention which includes a supporting frame generally designated by the numeral 12 which includes a generally flat bottom plate 14 having upstanding rods 16 mounted thereon adjacent each end and each side of the plate 14.

An inverted U-shaped subframe 18 has the free ends of the legs thereof attached to opposite remote ends of an axle 20 having support wheels 22 on the outer end thereof wherein the wheels 22 act as a support for the subframe 18.

Disposed on the plate 14 is a pair of pulley brackets 24 having pulleys 26 mounted thereon which are in opposition to a pair of pulley brackets 28 having pulleys 30 thereon mounted on the bight portion of the U-shaped subframe 18. A cable 32 interconnects the pulleys 30 and 26 in such a manner that the supporting plate 14 is suspended therefrom. Mounted on the plate 14 is a pair of upstanding side plates 34 which have their upper ends outwardly flared as indicated by the numeral 36. One end of the side plates 34 is provided with a longitudinal extension 38 projecting beyond the bottom plate 14. The end of the bottom plate 14 from which the projection 38 extends is provided with a suporting wheel assembly 40 providing a support for this end of the frame 12 and forwardly and upwardly extending braces 42 interconnect the axle 20 and the side plates 34 thereby preventing side movement of the frame 12 in relation to the subframe 18.

An upper plate 44 is disposed in parallel spaced relation to the lower plate 14 and is provided with depending side walls 46 having outwardly flared lower end portions 48 similar to but slightly shorter than the outwardly flared portions 36 of the side walls 34. The upper wall 44 is provided with a pair of outwardly extending lugs or brackets 50 positioned over the upstanding rods 16 whereby the plate 44 will be supported in elevated position. Disposed on the top of the brackets 50 is a coil spring 52 having a nut 54 in threaded engagement with the upper end of the rods 16 which is screw threaded whereby adjustment of the nut 54 will cause the plate 44 to move vertically in relation to the rods 16.

Mounted adjacent remote ends of the side plates 34 is a pair of end rollers 56 and 58 being mounted on shafts 60 journaled in the side walls 34. The shaft 60 journaled in the extension 38 is seated in a longitudinal slot 62 and is provided with a bracket 64, with a threaded extension 66 extending through a lug 68 and being provided with an adjustment nut 70 whereby rotation of the adjustment nut 70 will cause movement of the shaft 60 in the slot 62 thereby varying the tension on an endless conveying belt 72 encircling the end rollers 56 and 58. It will be noted that the conveyor belt 72 extending over the end roller 58 is positioned under a hopper 74 whereby sacked material or other material may be discharged onto the upper horizontal run of the conveying belt 72. A pair of vertically disposed rollers 76 may be provided with one of the rollers 76 being disposed on each side of the conveying belt 72 whereby the rollers 76 are provided with a concave peripheral surface 78 and are mounted on bracket means 80 for rotation about a vertical axis formed by shaft 82 for engagement with opposite edges of sacked material for guiding the material along the conveyor belt 72 and also begin crushing or conditioning of the material in the sack.

Journaled between the upper side plates 46 is a pair of end rollers 84 and 86 mounted on shafts 88 journaled in the side plates 46 and an endless conveyor belt 90 encircles the rollers 84 and 86. In this instance, the end roller 86 is adjustable by the same means as described in conjunction with end roller 58 and this permits varying the tension on the endless belt 90. The endless belt 90 is provided with a lower run which is disposed in spaced and generally parallel relation to the upper horizontal run of the endless belt 72 for receiving a sack of material 92 therebetween. The conveyor 90 is relatively short while the conveyor 72 is relatively elongated.

Mounted on the upper surface of the upper plate 44 is an electric motor 94 for driving an output shaft 96 with a pulley 98 thereon and endless belt 100. The belt 100 partially encircles pulley 102 mounted on shaft 60 at roller 56 and a pulley 104 on shaft 88 at roller 84 for driving the same. An idler pulley 106 is mounted on an eye member 108 having an elongated shank 110 slidably mounted within a bracket 112 mounted on the plate 44. A compression coil spring 114 is disposed between the eye member 108 and the edge of the bracket 112 whereby the idler pulley 106 will be spring urged into engagement with the belt 100 for retaining a spring tension on the belt 100 at all times.

As illustrated in Figure 1, the subframe 18 is provided with a hand winch 116 adjacent the upper end thereof having a handle 118 for winding the cable 32 thereon for raising and lowering one end of the frame 12.

A bracket 120 together with pulley 122 on the rear end of plate 44 is also supported by cable 32 to permit tilting of the frame 12 in relation to the subframe 18 to properly orientate the conveying belt 72 in relation to the chute 74.

Mounted between the side plates 34 is a pair of rollers 124 having an eccentrically disposed shaft 126 mounted in bearings 128 which are adjustable on the plates 34 whereby the position of the rotational center of the rollers 124 may be varied. The peripheral surface of the rollers 124 is in engagement with the undersurface of the upper horizontal run of the endless belt 72 whereby vibration and sequential compression and release of the sack 92 will be accomplished within certain limits whereby the material in the sack 92 will be agitated and broken up. A similar pair of rollers 130 is mounted between the upper side walls 46 on eccentric shafts 132 and adjustable bearings 134 and the rollers 130 are disposed between the rollers 124 thereby engaging the sack of material 92 as it progresses between the spaced runs of the conveyor belts 72 and 90 thereby thoroughly agitating, vibrating and otherwise breaking up any lumps or conditioning the material in the sack 92 without the sack being damaged. The outwardly flared portions 36 and 48 form a guide for the sacked material and prevent rupture of the sack 92 due to too much flattening thereof. Each of the shafts 126 and 132 is provided with a pulley 136 on the outer end thereof for engagement by the endless belt 100. Idler pulleys 138 are provided between the pulleys 136 on each pair of eccentric rollers 130 and 124 to assure positive driving of the eccentric rollers 124 and 130.

By adjusting the supporting bearings for the eccentric shafts 126 and 132, the movement of the rollers 124 and 130 may be adjusted thereby varying the degree of conditioning of the material passing between the conveyors. Also, by adjusting the nuts 54, the position of the upper conveyor may be varied in relation to the lower conveyor and the entire apparatus may be raised and lowered or tilted to properly position the conveyor in relation to the discharge chute 74 or any other supply of material.

While it has been illustrated with endless type conveyor belts, it will be understood that any type of conveying means may be employed such as rollers, corrugated belts or any other type of conveying mechanism. Also, it is pointed out that other types of vibrators may be employed and in fact electric vibrators within each conveyor means is contemplated.

Also contemplated is the use of chains and sprockets, V-belts and sheaves, gears, or other driving means in substitution for the endless belt 100 and pulleys. Also the upper and lower portions of the machine may be driven separately by two or more motors or engines.

The conveyors may be placed in any position such as an inclined or vertical position. Also, the conveyors may be equal in length and more than two conveyors may be employed if desired. It is pointed out that the device may be adapted for use with bulk material as well as sack material.

The machine of the present invention may effectively condition material such as sacked sugar, fertilizer or the like which is normally granular but has become caked or lumped during storage and the caked or lumpy condition may be thoroughly remedied without damage to the material within the sack or without damage to the sack thereby eliminating the necessity of unsacking the material and then resacking the material after it has been broken up. The device is especially useful in conjunction with fertilizer which now employs paper bags to a relatively large extent. Also, the device is extremely well adapted for burlap sacks and the like which normally are employed in sacking feed, cotton seed meal or the like and also may be employed for sacks of salt, sugar or the like. Also, the device may be employed for handling bulk material wherein the conveying means may be especially adapted for use in conjunction with such bulk material.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A machine for conditioning lumpy sacked material without damage to the sack comprising a supporting frame, an elongated endless conveyor belt supported on said frame and having an upper run for supporting sacks of material, a short endless conveyor belt supported on said frame in overlying relation to the elongated belt with a lower run in spaced relation to the upper end of the elongated belt, means for driving said belt, and vibration means engageable with the spaced parallel belt runs for alternately urging the runs toward each other for breaking lumps in sacks of material as they pass between spaced runs of the conveyor belts, said vibrating means including a pair of eccentric rollers disposed against the inner surface of each run of the belts, said eccentric rollers being adjustably mounted for varying the movement of the belt runs toward each other for conditioning material with varying degrees of lumpiness.

2. A machine for conditioning lumpy sacked material without damage to the sack comprising a supporting frame, an elongated endless conveyor belt supported on said frame and having an upper run for supporting sacks of material, a short endless conveyor belt supported on said frame in overlying relation to the elongated belt with a lower run in spaced relation to the upper run of the elongated belt, means for driving said belt, and vibration means engageable with the spaced parallel belt runs for alternately urging the runs toward each other for breaking lumps in sacks of material as they pass between spaced parallel runs of the conveyor belts, said elongated conveyor belts being mounted on spaced end rollers with one of the rollers being adjustable, and a pair of vertically disposed rollers at opposite edges of said elongated belt to guide material along the conveyor, and means for varying the inclination of the endless conveyor belt whereby they will be properly oriented to receive the lumpy material.

(References on following page)

References Cited in the file of this patent

UNITED STATES PATENTS

| | | |
|---|---|---|
| 103,086 | Russell et al. | May 17, 1870 |
| 1,360,850 | Wiseman | Nov. 30, 1920 |
| 1,704,823 | Denny | Mar. 12, 1929 |
| 1,728,969 | Hoodless | Sept. 24, 1929 |
| 1,893,938 | Ghent | Jan. 10, 1933 |
| 1,971,485 | Hosmer | Aug. 28, 1934 |
| 2,021,376 | Pierce | Nov. 19, 1935 |
| 2,281,860 | Renault | May 5, 1942 |

FOREIGN PATENTS

| | | |
|---|---|---|
| 283,231 | Germany | Apr. 6, 1915 |
| 1,073,702 | France | Mar. 24, 1954 |